United States Patent
Schoch

[11] 3,833,852
[45] Sept. 3, 1974

[54] INSPECTION HEAD MOUNTING APPARATUS

[75] Inventor: Walter K. Schoch, Maumee, Ohio
[73] Assignee: Owens-Illinois, Inc., Toledo, Ohio
[22] Filed: Aug. 16, 1973
[21] Appl. No.: 388,815

[52] U.S. Cl............. 324/71 R, 209/73, 324/158 F, 324/61 P
[51] Int. Cl........................................... G01n 27/00
[58] Field of Search......... 324/158 F, 71 R, 58.5 A, 324/58.5 B, 61 P; 209/73; 403/87

[56] References Cited
UNITED STATES PATENTS

| | | | |
|---|---|---|---|
| 2,616,068 | 10/1952 | McDonald | 318/452 |
| 3,393,799 | 7/1968 | Schmersal | 209/73 |
| 3,593,120 | 7/1971 | Mandula, Jr. et al. | 324/34 R |

Primary Examiner—Alfred E. Smith
Assistant Examiner—Rolf Hille
Attorney, Agent, or Firm—Steve M. McLary; E. J. Holler

[57] ABSTRACT

Apparatus to allow mounting of an inspection head such that its front face is parallel to and a fixed distance from an article to be inspected. In one type of device for measuring the thickness of dielectric articles, such as glass containers, an RF field is passed through the article and a voltage is sensed as a measure of thickness. The RF antenna and voltage probe are coaxial and coplanar in an inspection head. They both must be kept a fixed distance from the article to ensure accurate measurement. To accomplish this, the head is mounted on a tube passing through a head carrier. A swivel mechanism connects the head carrier to a main support. A stand-off roller is mounted adjacent the head and extending slightly beyond the head. To inspect an inclined surface, the swivel mechanism is activated to bring the face of the head carrying the antenna and probe into a parallel relationship with the inclined surface. The stand-off roller moves with the head and is therefore brought into a full contact position with the inclined surface. Thus, the antenna and probe are parallel to the surface being inspected and are maintained a fixed distance away from this surface.

9 Claims, 3 Drawing Figures

PATENTED SEP 3 1974　　　　　　　　　3,833,852

INSPECTION HEAD MOUNTING APPARATUS

BACKGROUND OF THE INVENTION

This invention generally relates to the inspection of glass articles. More particularly, this invention relates to measuring the thickness of glass articles by the use of radio frequency energy emitting and sensing head. Specifically, this invention relates to an improved mounting arrangement for such an inspection head which allows the head to be positioned parallel to an inclined glass surface to be measured.

One type of prior art device for measuring the thickness of glass articles is shown in U.S. Pat. No. 3,393,799. This device has proven to be an effective and useful commercial tool. However, the inspection head disclosed in that patent must be maintained a precise distance from an article being inspected to ensure accurate measurements. When measuring an inclined surface, such as a sloping shoulder portion of a glass container, this precise spacing could not be maintained using the inspection head mounting system disclosed in the cited patent. I have invented an improved mounting system for the inspection head disclosed in U.S. Pat. No. 3,393,799 which allows positioning of the head parallel to an inclined surface being inspected.

SUMMARY OF THE INVENTION

My invention is an improvement in an apparatus for measuring the thickness of articles formed of a dielectric material. In the apparatus, a head which has an annular antenna, which establishes a radio frequency field in front of the head and extending outwardly therefrom in the direction of an article, and a probe, positioned coaxially of the annular antenna and electrically insulated therefrom, which has a voltage induced therein which is an index of the thickness of that portion of the article immediately in front of the probe, is positioned adjacent an article to be inspected or measured. The apparatus further includes spacing means for maintaining the head at a fixed spacing from the article. My improvement is a head mounting means for maintaining the antenna and probe parallel to an inclined surface of the article being measured.

DETAILED DESCRIPTION OF THE DRAWINGS

This invention is an improvement on a dielectric member thickness measuring apparatus of the type disclosed in U.S. Pat. No. 3,393,799, the teachings of which are hereby incorporated by reference. In that patent, a device for measuring the thickness of dielectric members, particularly glass containers, is taught. In the system taught therein, an annular antenna is used to establish a radio frequency field in front of a head which carries the antenna, the field extending outwardly from the antenna in the direction of the glass container or other dielectric member or article which is being inspected. The article being inspected is positioned immediately adjacent to the antenna such that the radio frequency field passes through it. A sensing probe is positioned coaxially of the annular antenna and is electrically insulated from the antenna. The probe has a voltage induced in the probe which is an index of the thickness of that portion of the article which is immediately in front of the entire probe. It was found, that this particular system was quite sensitive to the distance at which the antenna and probe assembly were maintained from the article being inspected. Therefore, it was necessary to provide some means to maintain the head which carried the probe and the antenna a fixed distance away from the article. The operational difficulty which presented itself, and which led to the development of the present invention, was that when articles having sloped sides were measured, the distance of the antenna and probe assembly from the sloped side could not be maintained constant. This will be illustrated and explained better with reference to FIG. 2. The mounting system of the prior art head was such that the only movement available to this head was a vertical movement. Any angular or rotational movement of the head was not possible with the mounting system used.

Figure 1:
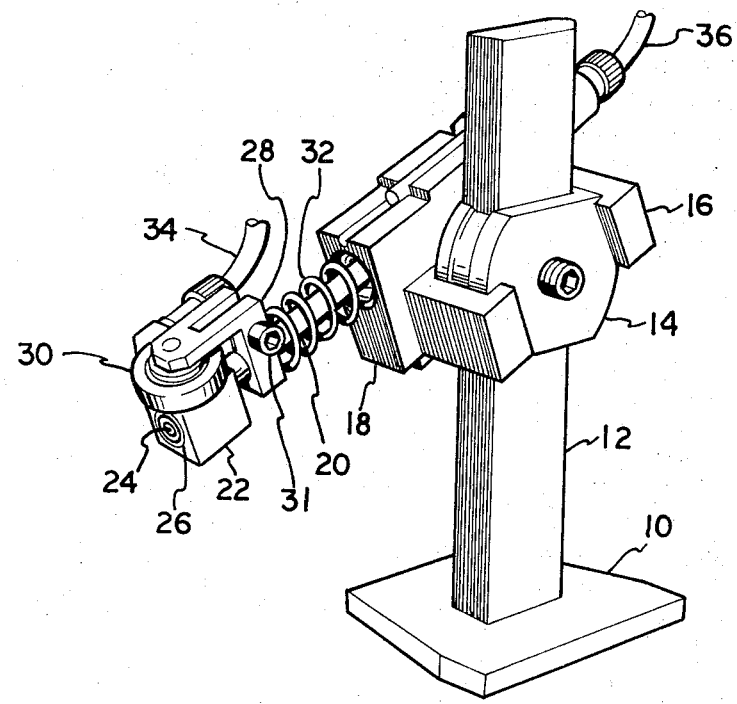
FIG. 1 is a perspective view of the present invention.

With reference to FIG. 1, the entire apparatus is supported from a mounting plate 10 which has extending vertically therefrom a support column 12. Reference is again had to U.S. Pat. No. 3,393,799 to see the general operational environment of the apparatus shown in FIG. 1. It is believed obvious to one skilled in the art how the mounting plate 10 and support column 12 may be used to replace the general supporting or support structure shown in the cited patent. A swivel control member 14 is slidably mounted on the support column 12. Mounted on the swivel control member 14 is a swivel block 16, which is capable of swivel or arcuate motion with respect to the swivel control member 14. The swivel block 16, in turn, supports a head carrier 18. The head carrier 18 has a hole drilled completely through it and passing through this hole is a probe carrier tube 20. Attached to the end of the probe carrier tube 20 is an inspection head 22. This is the inspection head taught by U.S. Pat. No. 3,393,799. At the exposed face of the inspection head 22 is a probe 24 and an annular antenna 26. It may be seen that the probe 24 and antenna 26 are not only coaxial but are also coplanar; that is, the exposed face of the inspection head 22 forms a plane in which both the antenna 26 and the probe 24 lie. Attached to the probe carrier tube 20 is an L-shaped split lock collar 28. The leg of the lock collar 28 extends over the top of the inspection head 22. A wheel 30 is rotatably attached to the leg of the lock collar 28. This wheel is preferably of a low-friction material, such as nylon. The lock collar 28 may be adjusted with respect to its position on the probe carrier tube 20 by loosening a set screw 31, positioning the lock collar 28, and retightening the set screw 31. This controls the distance the face of the inspection head 22 is behind the edge of the wheel 30. A coil spring 32 is positioned between the lock collar 28 and the head carrier 18 over the probe carrier tube 20. The coil spring 32 allows generally linear movement of the probe carrier tube 20. Thus, the wheel 30 is locked in a fixed position with respect to the probe 24 and antenna 26, but the absolute location of the probe 24 and antenna 26 is movable longitudinally as the wheel 30 follows the contours of an article that it is tracking. In the case of the inspection of glass containers, the surface of the container may be somewhat irregular, as, for example, at the mold seam points, thus causing the wheel 30 to move slightly outward in its tracking of the surface of the glass container. The radio frequency signal is introduced to the antenna 26 through an antenna input lead 34. The voltage induced in the probe 24 is transmitted to the electronic processing circuits through a probe output signal lead wire 36. The entire apparatus shown in FIG. 1 may be most generally described as a head mounting means for maintaining the antenna 26 and the probe 24 parallel to an inclined surface of an article being inspected. This may best be understood by reference to FIG. 2.

Figure 2:
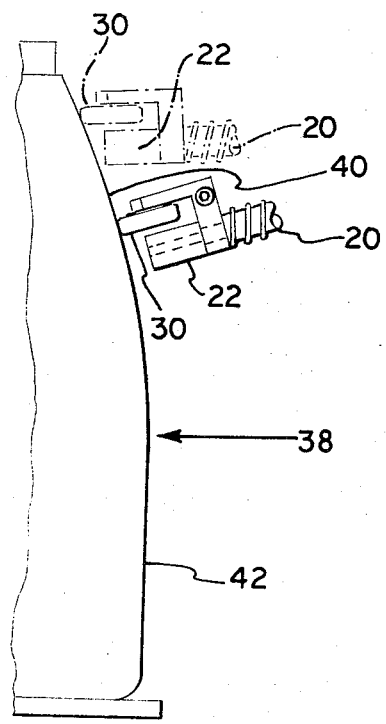
FIG. 2 is a side, elevational view of the positioning of the inspection head allowed by the present invention and the positional problem presented by the prior art.

In FIG. 2, the apparatus of FIG. 1 is shown in the position it would assume to inspect an article such as a glass container 38. The glass container 38 has a shoulder portion 40 which is inclined from the vertical and a body portion 42 which is of a substantially vertical configuration. In this inspction technique, the glass container 38 is oriented in a generally vertically upright position and is rotated before a fixed inspection head 22. The dotted representation of the inspection head 22 and the wheel 30 is that which would be assumed by the configuration taught in U.S. Pat. No. 3,393,799. It can be appreciated from this representation that only the lowermost edge of the wheel 30 contacts the shoulder 40 of the glass container and that the lower portion of the front face of the inspection head 22 is closer to the shoulder 40 of the glass container 38 than the upper portion of the inspection head 22. This is an extremely undesirable condition for this particular type of measuring apparatus, because the distance the antenna 26 and probe 24 are from the surface being inspection is a critical measurement parameter. It is necessary to maintain the wheel 30 at a specific fixed location to maintain the face of the inspection head 22 which contains the antenna 26 and probe 24 at a fixed location away from the surface of the glass container 38. In the case of an inclined portion such as the shoulder portion 40, this cannot be done without inclining the inspection head 22 or filing off the front face of the inspection head 22 to conform to the contour being inspected. The inspection head 22 is a relatively complicated assembly, and therefore filing such a surface is an extremely wasteful and expensive proposition, since a face filed to one angular contour might not fit an angular contour of a later glass container 38 to be inspected. The full line representation of the inspection head 22 and wheel 30 shown in FIG. 2 is that which is permitted or allowed by the apparatus shown in FIG. 1. As is readily seen in FIG. 1, the entire head carrier 18 may be rotated or swiveled with respect to the swivel control member 14. This is accomplished through the swivel block 16 which is carried by the swivel control member 14. Simply moving the head carrier 18 until the wheel 30 is in full contact with the surface to be inspected will assure that the antenna 26 and probe 24 will be parallel to the surface that is being inspected.

Figure 3:
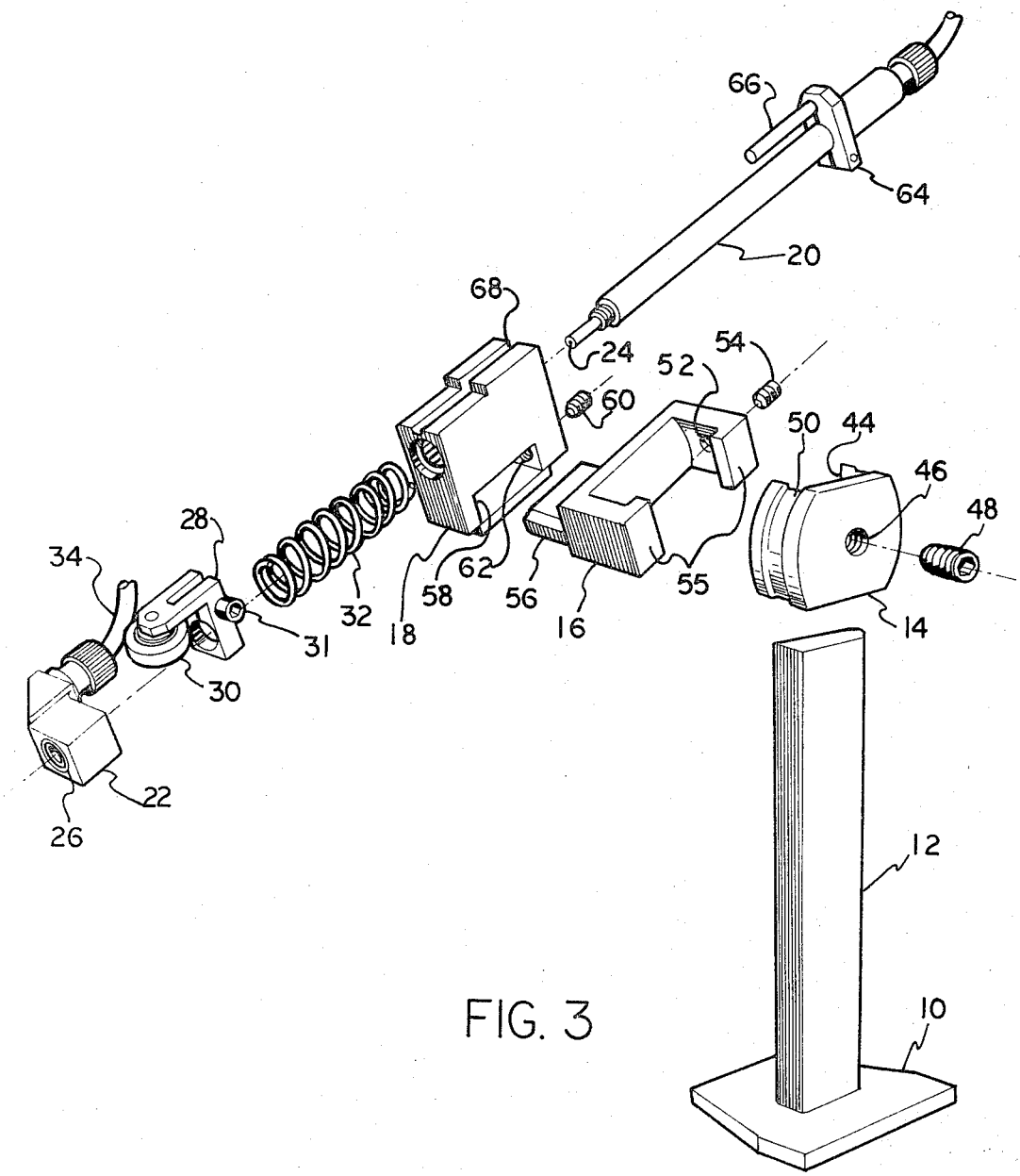
FIG. 3 is an exploded perspective view of the present invention.

The exploded view of FIG. 3 better illustrates the precise shape of the various components previously described and their functioal interrelationship. The swivel control member 14 may be seen to be a somewhat thickened disk which has diametrically opposed chordal portions removed therefrom. These chordal portions are removed to allow the swivel control member 14 to fit over the support column 12. To this end, a slot 44 is cut in one face of the swivel control member 14 to fit the contour of the support column 12. In this specific case, the support column 12 is generally rectangular in shape, so the slot 44 is likewise rectangular in shape to allow a sliding engagement. In order to hold the swivel control member 14 in a fixed location, a threaded hole 46 is formed in the face of the swivel control member 14 opposite the slot 44. A set screw 48 is engaged in the threaded hole 46, and when tightened will hold the swivel control member 14 at a fixed vertical position on the support column 12. A circumferential groove 50 extends around the thickness of the swivel control member 14. Of course, the groove 50 is divided into two separate segments in this situation because of the removal of the diametrically opposed chordal portions from the originall disk-shaped swivel control member 14. The swivel block 16 is a generally U-shaped member. The inside faces of the extending legs of the swivel block 16 (only one of which is visible in FIG. 3) have been cut in an arcuate form to conform to the curvature of the outside of the swivel control member 14. One of the legs has a threaded hole 52 drilled completely through it. A set screw 54 is engaged in the threaded hole 52. The set screw 54 engages with the circumferential groove 50 in the swivel control member 14 to lock the swivel control member 14 in a desired angular configuration. It should be appreciated that if the swivel block 16 is placed over the swivel control member 14, the swivel block 16 may be moved in a rotary or arcuate type of swiveling motion with respect to the fixed swivel control member 14. The extending legs of the swivel block 16 preferably terminate in inwardly directed ear portions 55 which help hold the swivel block 16 in position on the swivel control member 14. An attachment lug portion 56 of the swivel block 16 is integrally formed with and extends outwardly from the base of the U-shaped swivel block 16. An opening 58 is formed in the lower portion of the head carrier 18. To assemble the entire apparatus, the attachment lug 56 is slid into the opening 58. A set screw 60 extends into a threaded hole 62 formed in one side of the opening 58. When the set screw 60 is tightened, the attachment lug 56 is firmly held in position within the opening 58, and the head carrier 18 is thus attached to the swivel block 16. Thus, any motion of the swivel block 16 relative to the swivel control member 14 is likewise transmitted to the head carrier 18. A guide collar 64 is attached to the probe carrier tube 20. The guide collar 64 may be of the split type, which allows it to be moved back and forth along the length of the probe carrier tube 20 to a desired position and then locked in that position. A guide bar 66 is carried by the guide collar 64. The guide bar 66 extends longitudinally in the direction of the inspection head 22. The guide bar 66 fits into a longitudinally extending slot 68 formed in the surface of the head carrier 18. The engagement of the guide bar 66 in the slot 68 ensures that any motion of the inspection head 22 resulting from motion of the wheel 30 against the coil spring 32 will be constrained to linear motion.

I claim:

1. In an apparatus for measuring the thickness of an article formed of a dielectric material of the type wherein a head comprising an annular antenna, which establishes a radio frequency field in front of the head and extending outwardly therefrom in the direction of the article positioned adjacent thereto, and a probe, positioned coaxially of the annular antenna and electrically insulated therefrom, which has a voltage induced therein which is an index of the thickness of that portion of the article immediately in front of the probe, and wherein said apparatus includes spacing means for maintaining the head at a fixed spacing from the article, the improvement in said apparatus which comprises:

an elongated probe carrier tube, said head being connected to one end of said carrier tube adjacent said article;

a head carrier having an opening extending completely therethrough, said probe carrier tube being engaged in said opening;

support means positioned adjacent an article to be measured; and swivel means for connecting said head carrier to said support means to allow movement of said head and said spacing means in an arcuate path for positioning said head parallel to an inclined surface of said article.

2. The apparatus of claim 1, wherein said head carrier is further characterized by a second opening extending completely therethrough, said second opening being positioned substantially transverse to said opening for said carrier tube, and wherein said swivel means comprises:

a swivel control member, slidably mounted on said support means in a position allowing only substantially vertical movement, said swivel control member being generally of the shape of a disk having diametrically opposed chordal portions removed therefrom; and a generally U-shaped swivel block having an attachment lug portion extending from the base thereof into said second opening in said head carrier, the inner surfaces of the legs of said U-shaped swivel block being arcuately configured to fit the arcuate outer surface of said swivel control member, said swivel block being engaged with said swivel control member.

3. The apparatus of claim 2, further including means for locking said head carrier to said attachment lug portion of said swivel block.

4. The apparatus of claim 3, further including means for locking said swivel control member at a fixed location on said support means.

5. The apparatus of claim 4, further including means for locking said swivel block at a desired angular position with respect to said swivel control member.

6. Apparatus for mounting an article inspection head such that said inspection head will be maintained a fixed distance away from and parallel to an inclined surface of an article to be inspected comprising, in combination:

an elongated carrier tube attached to said inspection head;

a head carrier having an opening extending completely therethrough, said carrier tube being engaged in said opening;

a rotatably mounted wheel having its axis of rotation substantially perpendicular to said head, a portion of the peripheral surface of said wheel extending beyond a front face of said inspection head to thereby define a fixed distance from the edge of said wheel to said inspection head front face;

means for supporting said wheel;

support means positioned adjacent an article to be inspected; and swivel means for connecting said head carrier to said support means to allow positioning of said inspection head front face parallel to an inclined surface of said article while said wheel is in contact with said inclined surface.

7. The apparatus of claim 6, wherein said means for supporting said wheel comprises:

a substantially L-shaped lock collar positioned on said carrier tube at a location intermediate said inspection head and said head carrier, said lock collar having a leg portion, to which said wheel is attached, extending over said inspection head.

8. The apparatus of claim 7, wherein said carrier tube is slidably engaged in said carrier block, and wherein said apparatus further includes:

a coil spring, positioned over said carrier tube and trapped between said lock collar and said head carrier, said coil spring allowing movement of said wheel and said inspection head as a unit to compensate for irregularities in the surface of said article.

9. The apparatus of claim 7, wherein said head carrier is formed with a second opening extending completely therethrough, said second opening extending substantially transversely to said opening for said carrier tube, and wherein said swivel means comprises:

a swivel control member, slidably mounted on said support means for substantially vertical movement, said swivel control member being generally of the shape of a disk having diametrically opposed chordal portions removed therefrom; and a generally U-shaped swivel block having an attachment lug portion extending from the base thereof into said second opening in said head carrier, the inner surfaces of the legs of said U-shaped swivel block being arcuately cut to fit the arcuate outer surface of said swivel control member, said swivel block being engaged with said swivel control member.

* * * * *